United States Patent [19]

Levy

[11] 3,981,670

[45] Sept. 21, 1976

[54] APPARATUS FOR SHAPING A BRASSIERE

[75] Inventor: Jean Michel Bloch Levy, Barcelona, Spain

[73] Assignee: Central Corsetera S.A., Barcelona, Spain

[22] Filed: Sept. 6, 1974

[21] Appl. No.: 503,667

[30] Foreign Application Priority Data
Sept. 10, 1973   Spain .................................. 418621

[52] U.S. Cl. ............................... 425/398; 264/324; 425/410
[51] Int. Cl.² ........................................... B29C 3/00
[58] Field of Search ........... 425/400, 412, 384, 298, 425/445, 446, 143, 344, 346, 195, 399, 398; 249/160, 161, 162; 264/324, 292, 134, 322

[56] References Cited
UNITED STATES PATENTS

| | | | |
|---|---|---|---|
| 2,820,250 | 1/1958 | Stratton | 425/88 |
| 3,520,750 | 7/1970 | Li et al. | 425/400 |
| 3,597,800 | 8/1971 | Silverman | 425/400 |
| 3,669,594 | 6/1972 | Brown et al. | 425/397 |
| 3,880,561 | 4/1975 | Ferro | 425/398 |

*Primary Examiner*—Francis S. Husar
*Assistant Examiner*—Robert J. Charvat
*Attorney, Agent, or Firm*—Woodhams, Blanchard and Flynn

[57] ABSTRACT

An apparatus for at least partially forming a brassiere having a pair of male molds provided with substantially conical outer surfaces, which molds are movably supported on a first support device so that the spacing between the molds can be selectively varied. A die assembly is spaced opposite the molds and has a pair of circular openings extending therethrough, which openings are aligned with the molds. Clamping devices are provided for supporting a sheet of flexible material adjacent the die assembly so that the material extends across the openings. A driving device, such as a pressure cylinder, causes relative reciprocating movement between the die assembly and the molds, as by being connected to the molds, so that the molds are linearly advanced toward the die assembly so that the molds project through the openings in the die assembly and deform the material into a pair of cups. Heating means are associated with the apparatus for causing heating of the deformed material.

10 Claims, 3 Drawing Figures

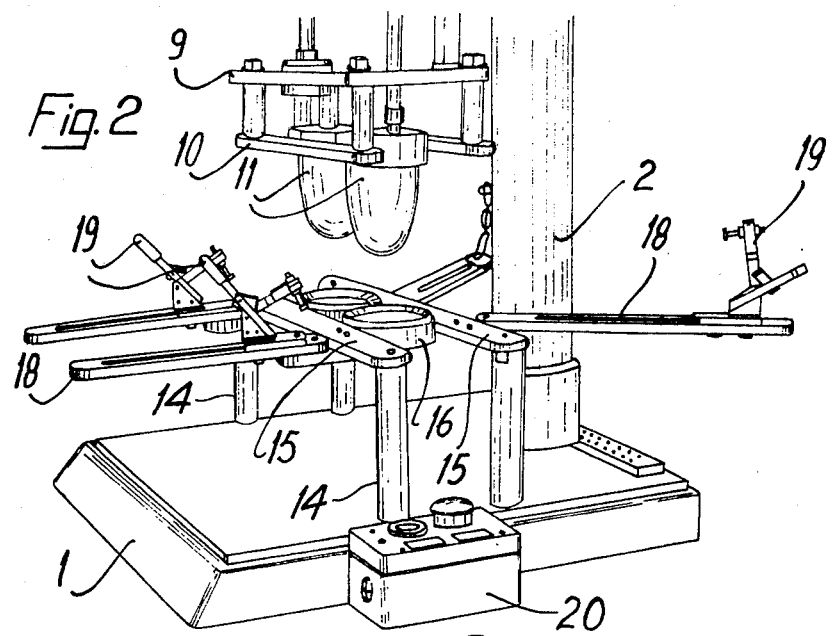
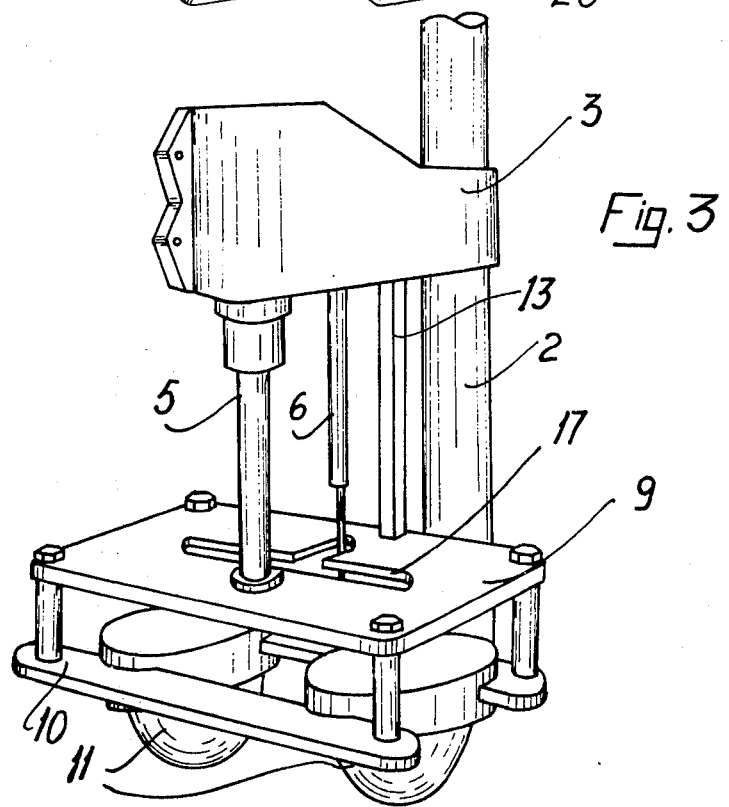

APPARATUS FOR SHAPING A BRASSIERE

BACKGROUND OF THE INVENTION

This invention deals with improvements in a machine for the molding and shaping of a flexible sheet during the manufacture of a brassiere.

The invention puts forward some developments designed to give notable improvements in the process of the manufacture of brassieres, more specifically some improvements in the stage of shaping and molding the cups of the garment.

Generally speaking, the improvements that are the subject of this invention are formed by an apparatus having a base which carries a support column for a horizontal arm carrying two pneumatic cylinders whose rods protrude and can be moved vertically. These rods carry the means for molding and forming the cups of the brassiere, which means comprises two electrically heated molds with an incorporated temperature control device.

The other device for the shaping of the garment is the small crosspiece on the centering device, acting on the area of material between the cups.

The above-mentioned molds are complemented by positioning elements formed by two rings which move and give support to the sheet in a horizontal plane which rings are positioned, according to the separation between the molds.

These molds can be moved laterally in a horizontal support plane in accordance with the desired separation between the cups, with both the molds and the positioning rings being of the interchangeable type so as to be removed or replaced according to the measurements of the brassiere cups to be formed.

In order to make this explanation clearer, two sheets of drawing are attached to this description which shows a possible practical construction, which is given here as an example.

BRIEF DESCRIPTION OF THE DRAWINGS

FIG. 2 shows detalis in perspective of the machine for shaping the garment, including the positioning devices, and devices for the holding and tensioning of the garment to be shaped.

FIG. 3 is another perspective view of the machine for shaping the garment, in which the organization of the mold support plate and its guides can be seen.

Figure 1:
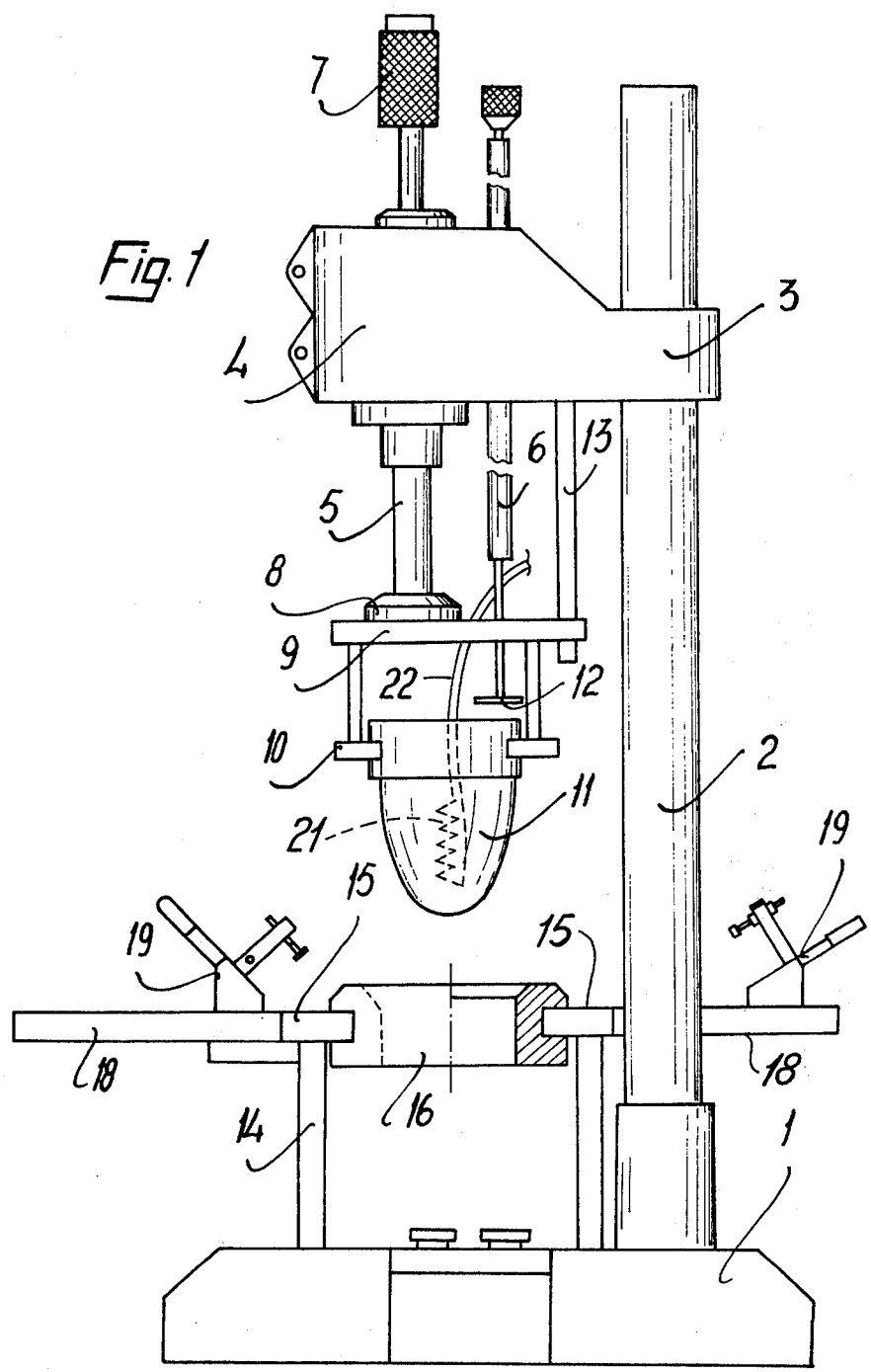
FIG. 1 is a side view of a machine designed for the molding and shaping of brassieres.

With reference to the drawings, they show a machine comprising a base 1, a column 2 suporting a horizontal arm 3, the end of which forms the body of two pneumatic cylinders having extendible rods 5 and 6.

DETAILED DESCRIPTION

On the upper end of the rod 5 there is an adjustable stop 7 which limits the movement of the rod, while the lower end 8 is joined to a plate 9 which supports the guides 10 for the removable molds, which molds having an outer conical molding surface 11. The molds 11 have slots on opposite sides of the cylindrical base thereof into which project the edges of the parallel guides 10, whereby the molds 11 can be slidably removed from guides 10 or the molds 11 can have their spacing varied.

The rod 6 has has an inverted T-shaped element 12 projecting downwardly from its lower end, which element 12 has the function of engaging the garment to be treated in the region between the rings 16.

The plate 9 moves with the rod 5 when this moves, and is guided by the prismatic bar 13.

Columns 14 are attached to the base 1 for the support of the guides 15 on which the removable dies or rings 16 are slidably supported, these rings being the means of positioning the molds 11. Rings 16 also have slots on opposite sides thereof into which project the edges of the parallel guides 15, whereby rings 16 can be slidably removed or their horizontal spacing varied.

The molds 11 are heated electrically. The resistance heaters 21 incorporated in these molds have leads 22 which come out to the exterior via the slot 17 in the plate 9. It is also through this slot that the temperature control device leads (not shown) come out, and this slot also allows the passage of the element 12.

Some slotted guides 18 are also provided for the positioning rings 16, on which guides 18 there are mounted pincher elements 19 which will hold the edges of the cloth and tense it so that it will stretch across the rings 16. The pinchers 19 are movable along guides 18 for adjustment purposes.

The molds 11 are of the interchangeable type, and the rings 16 can also be changed according to the thickness of the material. It will be appreciated that the mold 11 and rings 16 are held in their selected position by any conventional technique, such as by screws or the like. Further, in some instances, the friction which exists between the molds or rings and the associated guides is sufficient to hold the mold and rings in the selected position.

There is also a control panel 20 in which there is provided conventional control elements, specifically individual temperature control devices for each mold, as well as timers which will determine the duration of the action of the pistons carrying the molds 11 and the element 12, and with regulators for the valves controlling the speed of the pistons, a start control and a switch for stopping the shaping process.

The following work phases comprise the basic working cycle:

1. Pinchers 19 grip the material to tense it across the rings 16.
2. The centering piston 6 with element 12 comes down.
3. The mold group 5, 9, 10, 11 comes down with molds 11 being inserted through rings 16 so as to deform the material and thereby shape the brassiere cups.
4. The material is released from pinchers 19.
5. Centering piston 6 is retracted.
6. After a planned heating period of the material by the molds, which causes the material deformed around the molds to assume a permanent set, the mold group is retracted.

I claim:
1. In an apparatus for at least partially forming a brassiere, comprising:
    a frame;
    first and second support means mounted on said frame and disposed in spaced but opposed relationship to one another;
    shaping means for simultaneously shaping the cups of a brassiere from a sheet of flexible material;
    said shaping means including a pair of identical cup-shaped male molds disposed adjacent one another, each said mold having a substantially conical outer surface adapted to engage and deform the material therearound so that the molds form a pair of cups in said material, said molds being movably supported on said first support means for permitting the spacing between said molds to be selectively varied;

said shaping means further including die means defining therein a pair of adjacent circular openings which extend through said die means and are disposed in substantial alignment with said molds, said die means being removably mounted on said second support means;

clamping means for releasably holding a sheet of flexible material between said molds and said die means with said sheet being disposed directly adjacent said die means and extending across the openings thereof;

said shaping means also including heating means associated therewith for heating said flexible material as deformed by said molds; and drive means drivingly connected to one of said support means for causing reciprocating movement thereof between two end positions in a direction toward and away from the other of said support means, said one support means when in one of said end positions resulting in said molds being completely withdrawn from said openings and spaced from said die means, and said one support means when in the other of said end positions resulting in said molds projecting through said openings so as to deform the flexible material extending thereacross.

2. An apparatus according to claim 1, wherein said first support means includes a pair of substantially parallel and spaced support elements, and said pair of molds being disposed between and slidably supported on said support elements so that the molds can be slidably displaced in a direction parallel to the longitudinal direction of said support elements for selectively changing the spacing between said molds, and said support elements adjacent at least one end thereof being separated so that the molds can be totally slidably removed from the support elements and replaced by similar molds of a different size.

3. An apparatus according to claim 2, wherein said die means includes a pair of rings positioned adjacent one another in side-by-side relationship, said rings each having one of said openings extending therethrough, said rings being slidably supported on said second support means so as to permit the spacing between said rings to be selectively varied consistent with the spacing between said molds.

4. An apparatus according to claim 3, wherein said second support means includes a pair of elongated support members disposed in spaced and parallel relationship, said pair of rings being positioned between and slidably supported on said support members, and said support members adjacent at least one end thereof being totally spaced apart so that said rings can be completely slidably removed from said support elements and replaced by rings having different diameter openings therethrough.

5. An apparatus according to claim 4, wherein said first support means is disposed above said second support means and is supported for vertical movement relative to said frame, and said drive means being interconnected to said first support means for causing linear vertical reciprocating movement of said first support means so that said molds can be moved downwardly so as to project through the openings formed in said rings.

6. An apparatus according to claim 5, wherein said clamping means are mounted on said second support means for maintaining said sheet of flexible material in a position where it is positioned directly above said rings and extends across the openings therein, and wherein said heating means includes an electrical resistance heater mounted on each of said molds.

7. An apparatus according to claim 1, wherein said first support means is disposed above said second support means and is mounted on said frame means for vertical reciprocating movement toward and away from said second support means, said first support means including a first substantially horizontally extending support plate and a plurality of substantially vertical columns fixed to said support plate and projecting downwardly therefrom, and said first support means also including a pair of horizontally elongated guiding elements fixed to the lower ends of said columns and disposed in parallel but spaced relationship, and said molds each having a cylindrical base portion adjacent the upper end of the mold and a male molding part fixed to the base portion and projecting downwardly therefrom, the cylindrical base portion of each mold having a pair of slots formed in diametrically opposite sides thereof into which project said guiding elements whereby said molds are slidably supported on said guiding elements and can be relatively slidably displaced toward or away from one another in a horizontal direction which is substantially parallel to the elongated direction of said guiding elements.

8. An apparatus according to claim 7, wherein said drive means includes fluid pressure cylinder means connected to said support plate for linearly reciprocating same.

9. An apparatus according to claim 1, wherein said die means includes a pair of separate but identical ring members each having one of said circular openings extending therethrough, said ring members being individually slidably supported on said second support means so that the spacing between said ring members can be individually varied, and said second support means permitting said ring members to be completely slidably removed therefrom so as to permit further ring members having different diameter openings therethrough to be mounted on said second support means.

10. An apparatus according to claim 9, wherein said second support means includes a pair of horizontally elongated guiding elements disposed in spaced but parallel relationship within a substantially horizontal plane, said ring members being disposed between and slidably supported on said guiding elements so that each ring member can be individually slidably displaced in the longitudinal direction of the guiding elements.

* * * * *